(12) United States Patent
Kubo et al.

(10) Patent No.: US 11,102,375 B2
(45) Date of Patent: Aug. 24, 2021

(54) SHEET READING APPARATUS FOR DETECTING THE SHADOW OF A CONVEYED SHEET TO DETERMINE AN INCLINATION

(71) Applicants: Hiroshi Kubo, Kanagawa (JP); Kimiharu Yanagisawa, Tokyo (JP); Hajime Tsukahara, Kanagawa (JP); Yoshiaki Nagao, Kanagawa (JP); Masahiro Itoh, Kanagawa (JP); Tatsuya Ozaki, Kanagawa (JP); Tomohiko Ono, Kanagawa (JP); Yuuki Nakada, Kanagawa (JP); Hiroki Shirado, Kanagawa (JP); Ayumu Hashimoto, Kanagawa (JP)

(72) Inventors: Hiroshi Kubo, Kanagawa (JP); Kimiharu Yanagisawa, Tokyo (JP); Hajime Tsukahara, Kanagawa (JP); Yoshiaki Nagao, Kanagawa (JP); Masahiro Itoh, Kanagawa (JP); Tatsuya Ozaki, Kanagawa (JP); Tomohiko Ono, Kanagawa (JP); Yuuki Nakada, Kanagawa (JP); Hiroki Shirado, Kanagawa (JP); Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/654,007

(22) Filed: Oct. 16, 2019

(65) Prior Publication Data
US 2020/0137262 A1 Apr. 30, 2020

(30) Foreign Application Priority Data
Oct. 31, 2018 (JP) .............................. JP2018-205347

(51) Int. Cl.
*H04N 1/00* (2006.01)
*H04N 1/387* (2006.01)
*H04N 1/10* (2006.01)

(52) U.S. Cl.
CPC ....... *H04N 1/3878* (2013.01); *H04N 1/00572* (2013.01); *H04N 1/00588* (2013.01);
(Continued)

(58) Field of Classification Search
CPC ............. H04N 1/3878; H04N 1/00737; H04N 1/00588; H04N 1/1061; H04N 1/00718
See application file for complete search history.

(56) References Cited

U.S. PATENT DOCUMENTS

2007/0064267 A1 3/2007 Murakata et al.
2010/0309530 A1* 12/2010 Kamei ............... H04N 1/00734
358/474

(Continued)

FOREIGN PATENT DOCUMENTS

JP 6-203202 7/1994
JP 2001-077986 3/2001
(Continued)

*Primary Examiner* — Benjamin O Dulaney
(74) *Attorney, Agent, or Firm* — Xsensus LLP

(57) ABSTRACT

A sheet reading apparatus includes a sheet table on which a sheet is placed, a conveyor configured to convey the sheet, a reading guide configured to guide the sheet conveyed by the conveyor, and a reading device configured to read a shadow of the sheet conveyed by the conveyor, for detection of an inclination of the sheet. The sheet reading apparatus further includes a transparent member disposed at a position on a reading line of the reading device. The position on the reading line is withdrawn from the sheet and adjacent to the reading guide.

7 Claims, 11 Drawing Sheets

(52) U.S. Cl.
CPC ..... *H04N 1/00602* (2013.01); *H04N 1/00633* (2013.01); *H04N 1/00737* (2013.01); *H04N 1/1061* (2013.01); *H04N 2201/0094* (2013.01)

(56) References Cited

U.S. PATENT DOCUMENTS

| | | | |
|---|---|---|---|
| 2011/0194160 A1* | 8/2011 | Maki | H04N 1/00737 358/488 |
| 2012/0002252 A1 | 1/2012 | Kubo et al. | |
| 2012/0033272 A1* | 2/2012 | Lee | H04N 1/46 358/504 |
| 2014/0078560 A1 | 3/2014 | Nagao et al. | |
| 2014/0177012 A1 | 6/2014 | Kubo et al. | |
| 2015/0288838 A1* | 10/2015 | Tanaka | H04N 1/00692 358/474 |
| 2016/0198059 A1* | 7/2016 | Ku Bo | H04N 1/00748 358/1.13 |
| 2016/0360057 A1* | 12/2016 | Ogasawara | H04N 1/0057 |
| 2017/0232765 A1* | 8/2017 | Moriyama | B41J 13/0009 347/16 |
| 2018/0048786 A1* | 2/2018 | Sunada | H04N 1/3878 |

FOREIGN PATENT DOCUMENTS

| | | |
|---|---|---|
| JP | 2003-234890 | 8/2003 |
| JP | 2007-080178 | 3/2007 |
| JP | 2008-193167 | 8/2008 |
| JP | 2017-005355 | 1/2017 |
| JP | 2017-059990 | 3/2017 |

* cited by examiner

SHEET READING APPARATUS FOR DETECTING THE SHADOW OF A CONVEYED SHEET TO DETERMINE AN INCLINATION

CROSS-REFERENCE TO RELATED APPLICATIONS

This patent application is based on and claims priority pursuant to 35 U.S.C. § 119(a) to Japanese Patent Application No. 2018-205347, filed on Oct. 31, 2018, in the Japan Patent Office, the entire disclosure of which is incorporated by reference herein.

BACKGROUND

Technical Field

The present disclosure relates to a sheet reading apparatus and a document reading apparatus that provide high-quality image reading, and an image forming apparatus including same.

Discussion of the Background Art

There are sheet reading apparatus that include a background plate (a reading guide), a light source to irradiate an end of a document between the light source and the background plate, and a guide member on which a shadow of the end of the document is projected. The inclination (skew amount) of the shadow is detected, and the read image is rotated by the inclination (angle) to correct the skew.

SUMMARY

According to an embodiment of this disclosure, a sheet reading apparatus includes a sheet table on which a sheet is placed, a conveyor configured to convey the sheet, a reading guide configured to guide the sheet conveyed by the conveyor, and a reading device configured to read a shadow of the sheet conveyed by the conveyor, for detection of an inclination of the sheet. The sheet reading apparatus further includes a transparent member disposed at a position on a reading line of the reading device. The position on the reading line of the reading device is withdrawn from the sheet and adjacent to the reading guide.

According to another embodiment, an image forming apparatus includes the sheet reading apparatus described above and an image forming device.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
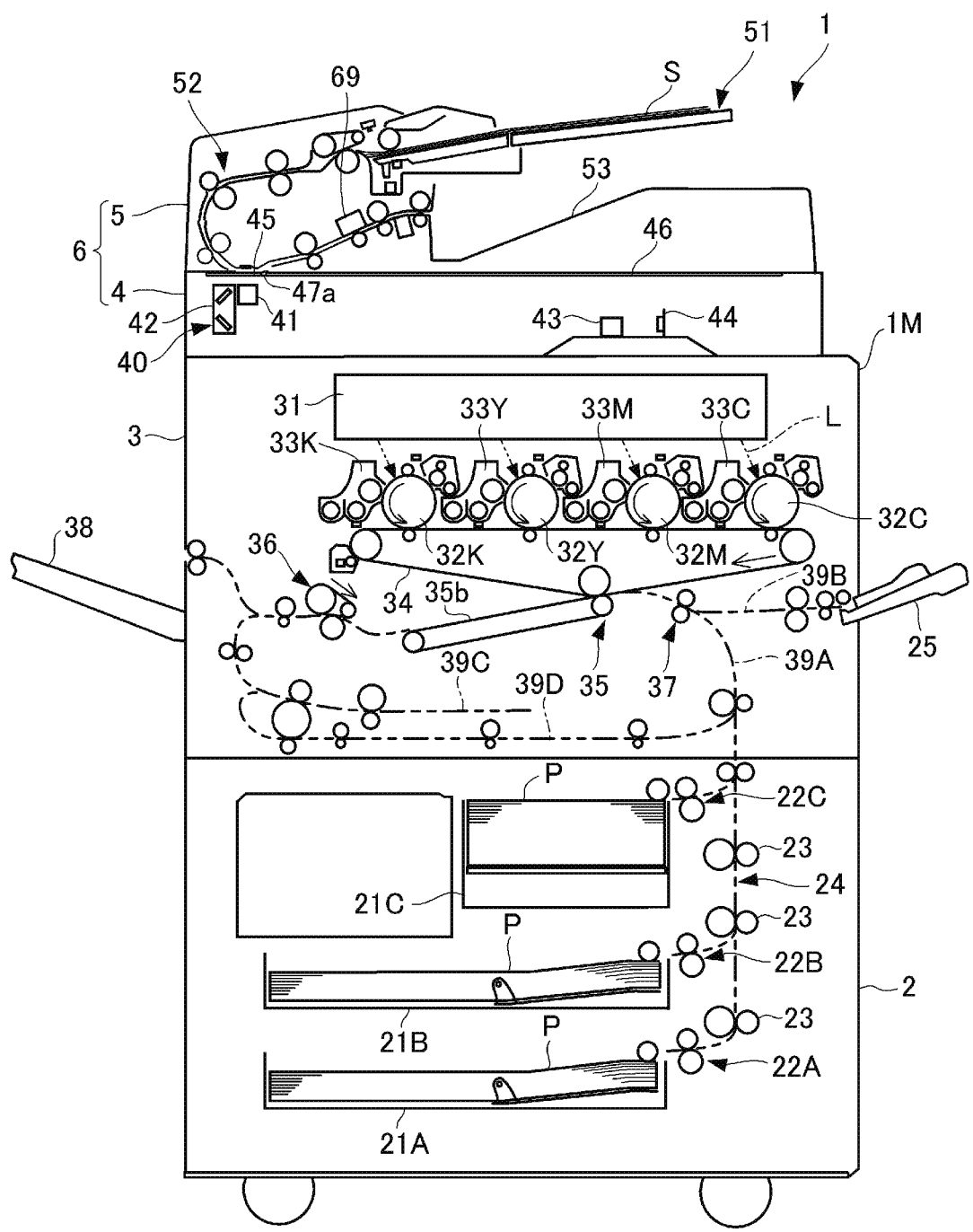
FIG. 1 is a front cross-sectional view illustrating a schematic configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of an embodiment applicable to a packaging body, with reference to the following figures.

As illustrated in FIG. 1, the image forming apparatus 1 is a digital multifunction peripheral including an apparatus body 1M and an automatic document feeder (ADF) 5 disposed atop the apparatus body 1M. The apparatus body 1M includes a sheet feeder 2, an image forming device 3, and an image scanner 4 (an image reading device). The image scanner 4 and the ADF 5 together construct an image reading apparatus 6. The image forming device 3 is an example of an image forming device according to this disclosure. The image reading apparatus 6 is an example of a document reading device according to this disclosure.

A description is given of the sheet feeder 2. The sheet feeder 2 includes three sheet trays 21A, 21B, and 21C banked vertically, each of which loads a bundle of cut transfer sheets P (recording media) stacked one on another. Each of the sheet trays 21A, 21B, and 21C loads the transfer sheets P (e.g., plain paper) having a size selected from a plurality of sheet sizes, and the transfer sheets P are oriented in a portrait or landscape sheet feeding direction.

The sheet feeder 2 includes respective sheet pickup members 22A, 22B, and 22C to pick up the transfer sheets P on the top in the sheet trays 21A, 21B, and 21C, separate the top sheets from the other transfer sheets P, and feed the picked transfer sheets P out the sheet trays 21A, 21B, and 21C. The sheet feeder 2 further includes multiple rollers 23 and a sheet feeding passage 24. The multiple rollers 23 convey the transfer sheet P fed by the selected one of the sheet pickup members 22A, 22B, and 22C to an image forming position of the image forming device 3 via the sheet feeding passage 24 defined by, for example, sheet guides and the multiple rollers 23.

A description is given of the image forming device 3. The image forming device 3 includes an exposure device 31, photoconductor drums 32K, 32Y, 32M, and 32C, developing devices 33K, 33Y, 33M, and 33C filled with toners of different colors, that is, black, yellow, magenta, and cyan, respectively. The image forming device 3 further includes a primary transfer unit 34, a secondary transfer unit 35, and a fixing unit 36.

The exposure device 31 generates laser beams L according to black, yellow, magenta, and cyan image data generated by the image reading apparatus 6 based on, for example, the image read by the image reading apparatus 6. The exposure device 31 exposes the photoconductor drums 32K. 32Y, 32M, and 32C with the laser beams L, forming electrostatic latent images of black, yellow, magenta, and cyan, corresponding to the read image data, on an outer circumferential surface of the photoconductor drums 32K, 32Y, 32M, and 32C, respectively.

The developing devices 33K, 33Y, 33M, and 33C disposed in proximity to the photoconductor drums 32K, 32Y, 32M, and 33C supply the black, yellow, magenta, and cyan toners to the electrostatic latent images formed on the photoconductor drums 32K. 32Y. 32M, and 32C so that the black, yellow, magenta, and cyan toners form thin layers, thus developing the electrostatic latent images into visible black, yellow, magenta, and cyan toner images, respectively.

In the image forming device 3, the black, yellow, magenta, and cyan toner images developed on the photoconductor drums 32K. 32Y. 32M, and 32C are primarily transferred onto an intermediate transfer belt of the primary transfer unit 34. The secondary transfer unit 35 disposed in proximity to the primary transfer unit 34 secondarily transfers the black, yellow, magenta, and cyan toner images from the primary transfer unit 34 onto the transfer sheet P conveyed from the sheet feeder 2, thus forming a color toner image on the transfer sheet P. The image forming device 3 apply heat and pressure, with the fixing fixing unit, to the color toner image secondarily transferred onto the transfer sheet P, thereby recording the color image thereon.

The image forming device 3 includes a conveyance passage 39A. The transfer sheet P received from the sheet feeder 2 through the sheet feeding passage 24 is conveyed through the conveyance passage 39A to the secondary transfer unit 35. In the conveyance passage 39A, first, the conveyance timing and the conveyance speed of the transfer sheet P are adjusted by a registration roller pair 37. The transfer sheet P passes through the secondary transfer unit 35 and the fixing unit 36 while being in synchronization with the belt speed in the primary transfer unit 34 and the secondary transfer unit 35, and then the transfer sheet P is ejected onto a sheet ejection tray 38.

The image forming device 3 also includes separation feeding a bypass sheet feeding passage 39B that feeds a transfer sheet to be placed on a manual feed tray 25 (e.g., a side tray) to the conveyance passage 39A on the upstream side of the registration roller pair 37. There can be also provided, as a reading unit, an optical unit in the vicinity of the bypass sheet feeding passage 39B or the conveyance passage 39A on the upstream side of the registration roller pair 37. The optical unit includes a light-emitting element, a light-receiving element, and the like, and is capable of reading, on a reading line, the shadow of the transfer sheet P conveyed on the conveyance passage 39A or the bypass sheet feeding passage 39B. The conveyance timing of the registration roller pair 37 may be variable.

Disposed below the secondary transfer unit 35 and the fixing unit 36 are a switchback conveyance passage 39C and a reverse conveyance passage 39D, both of which include, for example, a plurality of conveyance rollers and conveying guides.

To form images on both sides of the transfer sheet P, the switchback conveyance passage 39C allows switchback conveying. That is, the transfer sheet P bearing a fixed image on one side thereof enters from one end thereof, after which the transfer sheet P is conveyed backward (moved in the direction opposite to that at the time of entering).

The The reverse conveyance passage 39D reverses upside down the transfer sheet P having been switchbacked through the switchback conveyance passage 39C. From the reverse conveyance passage 39D, the transfer sheet P is again fed to the registration roller pair 37.

After image fixing process on one side thereof completes, the direction of the transfer sheet P is reversed through the switchback conveyance passage 39C and the reverse conveyance passage 39D. Then, the transfer sheet P is turned upside down and conveyed again into a secondary transfer nip. Then, the transfer sheet P is subject to the secondary transfer process and the fixing process of the image on the other side thereof, and then ejected onto the sheet ejection tray 38.

The image scanner 4 includes a first carriage 41 on which a light source 410 as a light-emitting element and a mirror are mounted, a second carriage 42 on which the mirror is mounted, an imaging forming lens 43, an imaging device 44 as a light-receiving element, and a first exposure glass 45 (a reading table). These components are disposed in the apparatus body 1M, and together construct an optical scanning unit 40 that reads an image on the image surface (e.g., image surface on the front side) on one side of a document sheet S as a recording medium to be conveyed on the first exposure glass 45. The optical scanning unit 40 serves as a reading device according to the present disclosure. The document sheet S is a sheet material, such as plain paper, gloss-coated paper, matt-coated paper, art-coated paper, an overhead projector (OHP) sheet, and embossed special paper.

The image scanner 4 also includes second exposure glass 46 on which the document sheet S is placed, an abutting member 47a capable of abutting and positioning one side of the document sheet S, and the like.

The first carriage 41 is disposed below the first exposure glass 45 and the second exposure glass 46 and movable in the lateral direction in the drawing. The position of the first carriage 41 is controllable. Note that the first carriage 41 may be fixed below the first exposure glass 45, and another carriage can be provided below the second exposure glass 46 in a movable manner. Illumination light from the light source 410 in the first carriage 41 passes through the first exposure glass 45, and irradiates the document sheet S on the first exposure glass 45. The light reflected by the document sheet S is imaged by the imaging forming lens 43 via the respective mirrors mounted on the second carriage 42, and the formed image is read by the imaging device 44. Note that the first carriage 41, the second carriage 42, the imaging forming lens 43, and the imaging device 44 can be integral as one carriage.

In the case of reading the image of the document sheet S placed on the second exposure glass 46, the image scanner 4 is capable of reading the image surface of the document sheet S placed on the second exposure glass 46 while moving, in a state where the light source 410 is turned on, the first carriage 41 and the second carriage 42 rightward in the drawing at a speed ratio of 2:1, for example. Further, the image scanner 4 can exhibit a function of reading a fixed document (what is called a flatbed scanner function).

In the case of reading an image of the document sheet S on the first exposure glass 45, the image scanner 4 is capable of stopping the first carriage 41 at a predetermined position directly below the first exposure glass 45. Further, the image scanner 4 has a capability to read an image on a first surface of the document sheet S (the front side of the document sheet S on a document table 51) being automatically conveyed without moving an optical system including the light source, a reflection mirror, and the like. Such a function is called a document feeding (DF) scanning.

The ADF 5 is configured as a sheet-through automatic document feeder. The ADF 5 includes the document table 51 that is a sheet table (a document table), a document conveyer 52 including various rollers, guide members, and the like, and a document sheet ejection tray 53 for collecting the document sheet S after image reading. The document table 51 is capable of holding at least one document sheet S in a form of cut sheet, that is, for example, a bundle of document sheets S (a plurality of document sheets). Further, the document table 51 covers and accommodates the document sheet S together with a sheet feeding cover 55. The document table 51 is included in a part of a sheet container according to the present disclosure.

After the image is read on the first exposure glass 45, the document sheet S is conveyed by the document conveyer 52 in the conveyance downstream direction. The document conveyer 52 includes a back surface reading unit 69 provided in the conveyance downstream direction of the first exposure glass 45. When the document sheet S passes by the reading position, the back surface reading unit 69 reads the image on the back surface of the document sheet S. The document sheet S having passed the back surface reading unit 69 is ejected onto the document sheet ejection tray 53 by sheet ejection rollers 67.

The ADF 5 is connected to, via a hinge mechanism, an upper part of the apparatus body 1M of the image forming apparatus 1 in an openable/closable manner. The ADF 5 is subject to rotary operation between an open position at which the first exposure glass 45 and the second exposure glass 46 are exposed in the image scanner 4 and a close position at which the first exposure glass 45 and the second exposure glass 46 are covered.

The image forming device 3 includes an exposure device 31, photoconductor drums 32K, 32Y, 32M, and 32C, and developing devices 33K. 33Y, 33M, and 33C filled with toners of black (K), yellow (Y), magenta (M), and cyan (C). The image forming device 3 further includes the primary transfer unit 34, the secondary transfer unit 35, and the fixing unit 36.

The exposure device 31 generates, for example, laser light L for exposure of each color based on the image read by the image reading apparatus 6. The exposure device 31 exposes the photoconductor drums 32K, 32Y, 32M, and 32C of the respective colors, and forms electrostatic latent images of the respective colors corresponding to the read image on surface layers of the photoconductor drums 32K, 32Y. 32M, and 32C.

The developing devices 33K, 33Y, 33M, and 33C supply thinly layered toner to the corresponding photoconductor drums 32K, 32Y, 32M, and 32C, and develop the electrostatic latent images to be visualized with the toner.

The image forming device 3 primarily transfers the toner images developed on the photoconductor drums 32K, 32Y. 32M, and 32C onto the primary transfer unit 34, and secondarily transfers the toner images onto the transfer sheet P with the secondary transfer unit 35 adjacent to the primary transfer unit 34. Further, the image forming device 3 heats and presses the toner image secondarily transferred onto the transfer sheet P with the fixing unit 36, thereby fixing and recording the color image onto the transfer sheet P.

The full-color image is pressed and heated in the fixing unit 36 to be fixed on the transfer sheet P conveyed to the fixing unit 36, and then the transfer sheet P is sent from the fixing unit 36 to the sheet ejection roller pair, and is ejected onto the sheet ejection tray 38 outside the machine.

Figure 2:
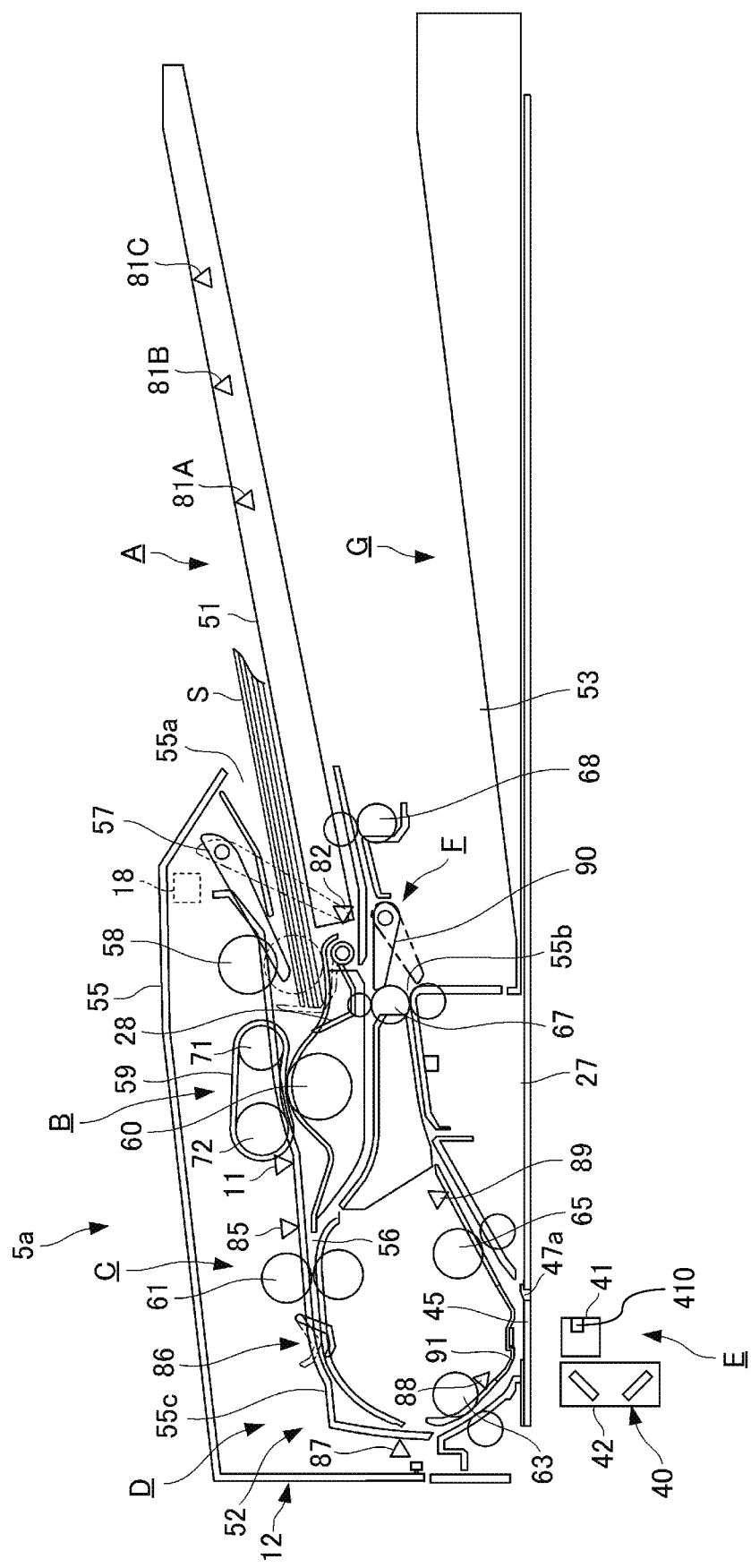
FIG. 2 is a schematic view illustrating a configuration of an automatic document feeder (ADF) according to the embodiment of the present disclosure.

FIG. 2 is a schematic view illustrating a configuration of an ADF 5a that is an automatic document feeder that can replace the ADF 5 illustrated in FIG. 1. The ADF 5a has a duplex mechanism different from that of the ADF 5 as described later.

As illustrated in FIG. 2, the ADF 5a includes, as a plurality of functional units, a document setting unit A, a separation feeding unit B, a registration unit C, a turn unit D, a reading conveyance unit E, an ejection unit F, and a stack unit G. Among the plurality of functional units mentioned above, functions of the separation feeding unit B, the registration unit C, the turn unit D, the reading conveyance unit E, and the ejection unit F are mainly implemented by the document conveyer 52.

The document conveyer 52 is covered by a sheet feeding cover 12 at least the upper side of which is openable and closable. The sheet feeding cover 12 has a sheet feeding port 55a such that the leading end of the document sheet S faces the inside of the sheet feeding cover 12. Further, the sheet feeding cover 12 covers the upper side of the leading end of the document table 51 such that the leading end of the document table 51 is positioned inside the sheet feeding port 55a.

The document conveyer 52 has a range from the sheet feeding port 55a to a sheet ejection port 55b above the document sheet ejection tray 53 covered by a rib 55c on the sheet feeding cover 55 of the sheet feeding cover 12 or the like, other guide members, and the like, thereby forming a conveyance passage 56. The sheet feeding cover 55 is included in a part of the sheet container according to the present disclosure.

The document conveyer 52 includes a separation sensor 11, an abutment sensor 85, a document width sensor 86, a reading entry sensor 87, a registration sensor 88, and a sheet ejection sensor 89, which are disposed in that order from the upstream side to the downstream side in the conveyance direction of the document sheet S. Those sensors detect the position and the shape of the document sheet S in the conveyance passage 56. In particular, the reading entry sensor 87, the registration sensor 88, and the sheet ejection sensor 89 are used to control a conveyance distance, a conveyance speed, and the like of the document sheet S, detecting a paper jam, and the like.

In the document setting unit A, a bundle of documents is set on the document table 51 in such a manner that the leading end of the bundle of the document sheets S in the feeding direction abuts on a document abutting claw 28. In a case where the document sheet S is single-sided, the bundle of documents is set on the document table 51 with the front surface facing upward.

The separation feeding unit B separates the uppermost document one by one from the bundle of the document sheets S placed on the document table 51 of the document setting unit A. The separation feeding unit B feeds the document to the entrance of the conveyance passage 56.

The registration unit C has a function of aligning the document sheets S sequentially fed from the separation feeding unit B to a required conveyance position based on primary abutment, and a function of pulling out and conveying the document sheets S having been aligned to the downstream side.

The turn unit D has a reverse conveyance function of turning back and conveying the document sheet S pulled out and conveyed by the registration unit C such that the front and back sides are reversed, and of turning the front surface of the document sheet S downward in the drawing.

The reading conveyance unit E conveys the document sheet S having been turned by the turn unit D in the sub-scanning direction (direction orthogonal to the main scanning direction that is a document width direction) at a predetermined speed while passing the document sheet S by a reading line 20 (i.e., a reading position) on the first exposure glass 45.

The ejection unit F ejects, to the side of the stack unit G the document sheet S having been conveyed by the reading conveyance unit E and in which the reading of the document image has been complete. Further, in a case where the back surface of the document sheet S needs to be read, without ejecting the document sheet S to the side of the stack unit G, the ejection unit F reverses the document sheet S to convey the document sheet S again through the conveyance passage 56. As a result, the reversed document sheet S passes through the reading conveyance unit E and the back surface thereof is read. Accordingly, both sides of the document sheet S are read.

The stack unit G sequentially stacks, on the document sheet ejection tray 53 disposed below the document setting unit A, the document sheets S sequentially ejected from the ejection unit F with the front surfaces thereof facing downward. The document sheets S to be stacked in the stack unit G are in the page order same as that at the time when the document sheets S are placed in the document setting unit A. The document sheets S are stacked upside down as the entire bundle.

These document setting unit A, the separation feeding unit B, the registration unit C, the turn unit D, the reading conveyance unit E, the ejection unit F. and the stack unit G are controlled by a controller to control automatic document feeding.

The ADF 5*a* separates the uppermost document sheet S one by one from the bundle of the document sheets S placed on the document table 51, and conveys the document sheet S through a predetermined conveyance passage on the first exposure glass 45 with the document conveyer 52. Furthermore, in the ADF 5*a*, after the image scanner 4 reads the image of the document sheet S passing on the first exposure glass 45, the document sheet S is ejected onto the document sheet ejection tray 53.

The document table 51 on which the document sheet S is placed upward is disposed in such a manner that the side of the document conveyer 52 is the leading end side of the document sheet S, and the leading end side is inclined downward and the rear end side is inclined upward.

Furthermore, the ADF 5*a* includes, in the document table 51, document length sensors 81A to 81C provided to be spaced apart along the feeding direction. While the document length sensors 81A to 81C include, for example, publicly-known reflective photosensors, the document length sensors 81A to 81C are not limited thereto, and can be micro switches or photosensors that sense the operation of an actuator including a spring or a hinge lever.

As illustrated in FIG. 2, the document length sensors 81A to 81C detects an approximate length of the bundle of documents in a state where the leading end of the bundle of the document sheets S abuts on the document abutting claw 28 and the bundle of the documents is set on the document table 51. Here, the document abutting claw 28 adjusts the position of the bundle of the documents set on the document table 51.

The ADF 5*a* includes a document set filler 57 to be rotated by the document sheet S placed on the document table 51 at the upper side of the leading end of the document table 51 that is the upstream end on the side of the sheet feeding port 55*a* with reference to the conveyance direction of the document sheet S.

Furthermore, the ADF 5*a* includes, in the vicinity of the bottom surface near the leading end of the document table 51, a document set sensor 82 that detects whether or not the document sheet S is set on the document table 51 by detecting the lowermost part on the movement trajectory of the leading end of the document set filler 57. The document set sensor 82 detects whether or not the document set filler 57 has rotated to be away from the document set sensor 82, thereby detecting whether or not the document sheet S is set on the document table 51. The document set sensor 82 is included in a sheet detector according to the present disclosure.

Furthermore, the ADF 5*a* includes a pressure plate 27 formed in a flat plate shape and disposed to face the second exposure glass 46. The pressure plate 27 presses a book or a document to be read against the second exposure glass 46.

The document conveyer 52 includes a pickup roller 58, which is disposed on the downstream side of the sheet feeding port 55*a* in the conveyance direction of the document sheet S and serves as a call roller, and an endless sheet feeding belt 59 and a reverse roller 60 (sheet feeder) disposed near the conveyance passage 56 on the downstream side of the pickup roller 58. The sheet feeding belt 59 and the reverse roller 60 are disposed to face each other with the conveyance passage interposed therebetween. The pickup roller 58, the sheet feeding belt 59, and the reverse roller 60 together construct a separation feeding unit according to the present disclosure. The sheet feeding belt 59 and the reverse roller 60 separate the document sheets S picked up by the pickup roller 58 one by one.

The pickup roller 58 moves up and down through a cam mechanism, carries out friction conveyance of several (preferably one) document sheets S from the uppermost side of the document sheets S placed on the document table 51 at the contact position, and picks up and convey sequentially the document sheets S to a separation unit. Here, the separation unit includes a driving roller 71, a driven roller 72, the sheet feeding belt 59, and the reverse roller 60.

Figure 3:
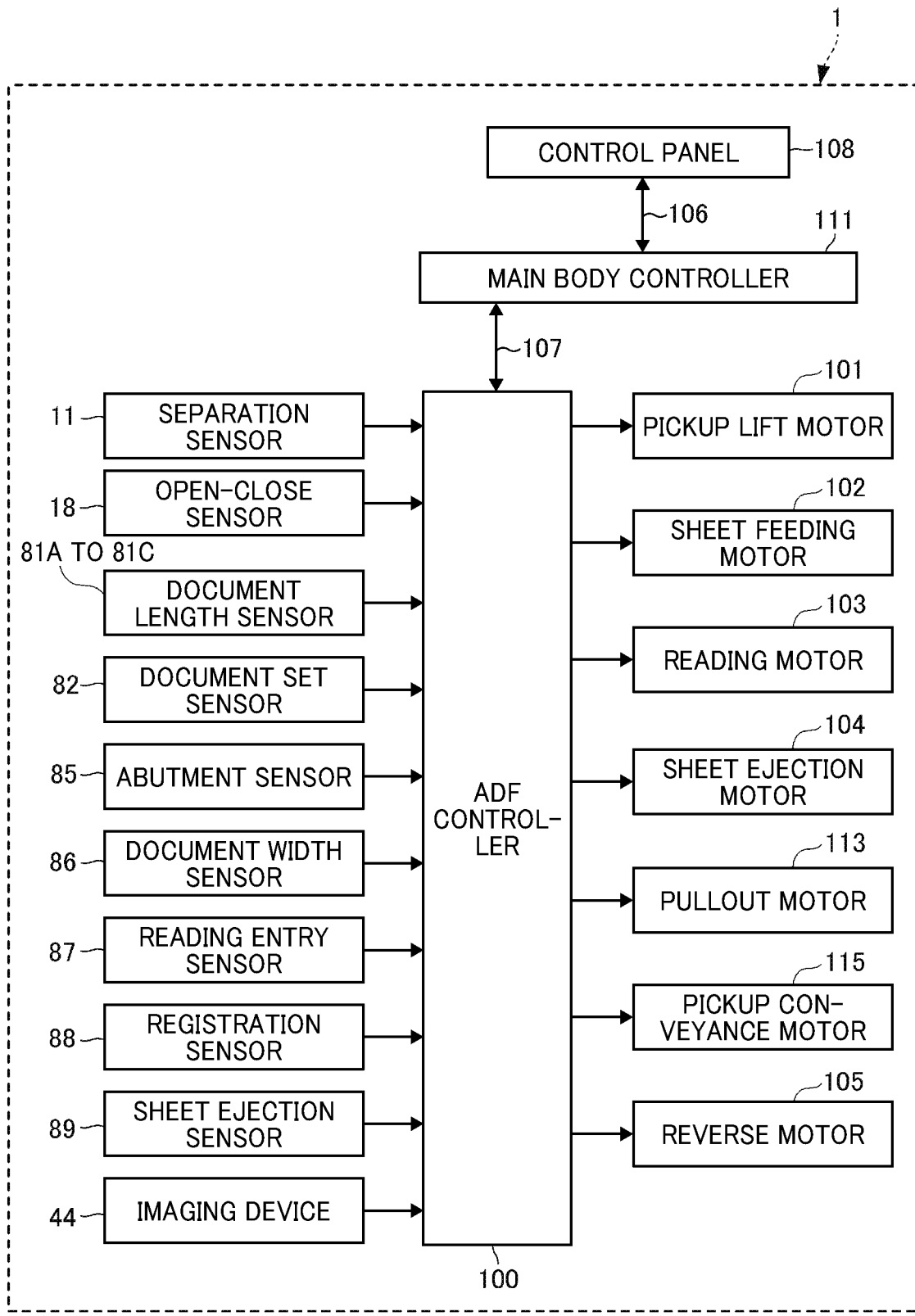
FIG. 3 is a block diagram illustrating a control configuration of the ADF according to the embodiment of the present disclosure.

The sheet feeding belt 59 rotates in the conveyance direction of the document sheet S with the driving roller 71 to be driven by a sheet feeding motor 102 (see FIG. 3).

The reverse roller 60 is rotatable in the direction opposite to the feeding direction of the sheet feeding belt 59, and is capable of separating the uppermost document sheet S from the lower document sheets S and feeding only the uppermost document sheet S. In addition, the reverse roller 60 incorporates a torque limiter. The reverse roller 60 is pressed against the sheet feeding belt 59, and in the state of contacting the sheet feeding belt 59 directly or via one document sheet S, the torque limiter operates to corotate with the sheet feeding belt 59.

When a plurality of document sheets S enters between the sheet feeding belt 59 and the reverse roller 60, the co-rotational force of the reverse roller 60 in the counterclockwise direction becomes lower than the force corresponding to the set torque of the torque limiter. Accordingly, the reverse roller 60 rotates in the clockwise direction, which is the driving direction, and returns the double-fed document sheets S, thereby preventing double-feeding of the document sheets S.

One of the document sheets S separated from the rest, due to the action of the sheet feeding belt 59 and the reverse roller 60, is further fed by the sheet feeding belt 59. As the abutment sensor 85 on the downstream side in the conveyance direction detects the leading end thereof, the document sheet S is stopped with the leading end abutting on a conveyance roller pair 61 not rotating. The abutment sensor 85 is disposed between the sheet feeding belt 59 and the conveyance roller pair 61 and detects the leading end and the rear end of the document sheet S.

Further, the document conveyer 52 includes the conveyance roller pair 61 serving as pullout rollers that nip and convey the document sheet S to face each other across the conveyance passage 56, a conveyance roller pair 63 serving as reading inlet rollers, and a conveyance roller pair 65 serving as reading outlet rollers. Each of the conveyance roller pairs 61, 63, and 65 conveys the document sheet S to the document sheet ejection tray 53. The number and position to arrange each of the conveyance roller pairs are set appropriately depending on the route design of the conveyance passage 56, the length of the minimum size of the document sheet S in the conveyance direction accepted by the ADF 5a, and the like. The conveyance roller pairs 61, 63, and 65 together serve as a conveyor according to the present disclosure.

After being detected by the abutment sensor 85, the document sheet S is fed to the conveyance roller pair 61 a sufficient distance, so that the document sheet S is pressed against the conveyance roller pair 61 and warped. The distance here may be changed depending on the property of the document sheet S or the like. The feeding motor is stopped in that state, thereby stopping the driving of the sheet feeding belt 59.

At this time, the pickup roller 58 in contact with the upper surface of the document sheet S is retracted upward by the rotation of a pickup lift motor 101 (see FIG. 3). In this manner, as the document sheet S is fed by the conveying force of the sheet feeding belt 59, the leading end of the document sheet S enters the nip of the upper and lower rollers of the conveyance roller pair 61. Thus, the leading end is aligned (skew correction to be described later).

The conveyance roller pair 61 are driven by a pullout motor 113 (a driver, see FIG. 3). The pullout motor 113 rotates the conveyance roller pair 61 to apply a conveyance force to the document sheet S picked up by the pickup roller 58, to feed the document sheet S. The pullout motor 113 serves as a sheet feeder according to the present disclosure.

The leading end of the document sheet S is detected by the abutment sensor 85 and caught in the the conveyance roller pair 61. Thus, the document sheet S is stopped for skew correction. After the correction, the conveyance roller pair 61 conveys the document sheet S in the conveyance direction.

The document width sensor 86 is disposed downstream from the conveyance roller pair 61 in the conveyance direction of the document sheet S. The document width sensor 86 detects the size, in the width direction orthogonal to the conveyance direction, of the document sheet S conveyed by the conveyance roller pair 61. The document width sensor 86 includes a plurality of detection targets arranged along the width direction of the document sheet S and an optical element. An end of each detection target rotates around an axis, and other end contacts the document sheet S. The document width sensor 86 is configured to detect, with the optical element, the movement of the detection target. Note Alternatively, the document width sensor 86 can include a plurality of light emitting elements arranged along the width direction of the document sheet S and light receiving elements disposed at positions facing the light emitting elements across the conveyance passage 56. In addition, the length of the document sheet S in the conveyance direction can be detected based on the detection of the leading end and the rear end of the document sheet S by the abutment sensor 85 and the pulse count of the motor between the detections of the leading end and the rear end.

When the reading entry sensor 87 detects the leading end of the document sheet S, the ADF 5a starts deceleration so that the conveyance speed of the document sheet S is set to a predetermined speed before the leading end of the document sheet S enters the nip of the pair of upper and lower rollers of the conveyance roller pair 63. At the same time, the ADF 5a drives a reading motor 103 in the forward direction to drive the conveyance roller pair 63 and the conveyance roller pair 65.

The conveyance roller pair 63 convey the document sheet S toward a document reading guide 91 (a sheet guide). The conveyance roller pair 65 conveys, toward the side of the ejection unit F, the document sheet S that has been read while passing the space between the document reading guide 91 and the first exposure glass 45 of the image scanner 4 facing thereto. The document reading guide 91 guides the document sheet S conveyed on the first exposure glass 45 of the image scanner 4. The document reading guide 91 serves a reading guide according to the present disclosure.

Furthermore, the document conveyer 52 includes the sheet ejection rollers 67, a bifurcating claw 90, and reverse rollers 68.

The sheet ejection rollers 67 ejects the document sheet S conveyed by the conveyance roller pair 65 onto the document sheet ejection tray 53 in a case where the front surface of the document sheet S has been complete and the back surface is not to be read.

The reverse rollers 68 reverses the document sheet S that has been guided by the bifurcating claw 90 and conveyed and has not been ejected onto the document sheet ejection tray 53 in a case where the front surface of the document sheet S has been complete and the back surface is further to be read. The sheet ejection rollers 67 convey the reversed document sheet S toward the conveyance roller pair 61.

As illustrated in FIG. 3, the image forming apparatus 1 includes an automatic document feeding (ADF) controller 100 for ADF control, a main body controller 111 configured to control the apparatus main body, and a control panel 108 accompanying the main body controller 111.

The control panel 108 includes an input and output device, such as buttons for starting operation and printing and a panel. The ADF controller 100 and the main body controller 111 are connected via an interface 107. When a start button of the control panel 108 is pressed and input signals are obtained, the main body controller 111 transmits document sheet feeding signals and reading start signals to the ADF controller 100 via the interface 107.

The ADF controller 100 receives detection signals from the separation sensor 11, an open-close sensor 18, the document length sensors 81A to 81C, the document set sensor 82, the abutment sensor 85, the document width sensor 86, the reading entry sensor 87, the registration sensor 88, the sheet ejection sensor 89, and the imaging device 44. The imaging device 44 serves as a skew amount detector according to the present disclosure.

The ADF controller 100 operates the pickup lift motor 101 that moves the pickup roller 58 up and down, the sheet feeding motor 102 that drives the sheet feeding belt 59, and the reading motor 103 that drives the conveyance roller pairs 63 and 65.

The ADF controller 100 further operates a sheet ejection motor 104 that drives the sheet ejection rollers 67, the pullout motor 113 that drives the conveyance roller pair 61, a pickup conveyance motor 115 that drives the pickup roller 58, and a reverse motor 105 that drives the reverse rollers 68.

Based on the skew amount detected by the imaging device 44, the ADF controller 100 causes the leading end of the fed document sheet S to abut on the conveyance roller pair 61 and corrects the inclination of the image read by the optical scanning unit 40, that is, corrects the skew. The imaging device 44 detects a shadow projected on the document reading guide 91 to be described later based on the reflection amount of irradiation light detected by the optical scanning unit 40 at the detection position. The ADF controller 100 is included in a correction unit according to the present disclosure. The image forming device 3 form an image based on the correction on the read image, made by the ADF controller 100, as described above.

When the leading end of the document sheet S is detected by the registration sensor 88, the ADF controller 100 transmits conveyance stop signals to the main body controller 111 via the interface 107. Furthermore, when the leading end of the document sheet S is detected by the registration sensor 88, the ADF controller 100 decelerates the conveyance speed by a predetermined conveyance distance, and temporarily stops the document sheet S in front of the reading line 20. Hereinafter, the position of the leading end of the document sheet S at the time of transmitting the conveyance stop signals will also be referred to as a registration position.

Subsequently, when the reading start signals are received from the main body controller 111, the ADF controller 100 conveys the document sheet S having been temporarily stopped such that the conveyance speed is increased to a predetermined level until the leading end of the document sheet S reaches the reading position on the reading line 20.

The ADF controller 100 starts to transmit, to the main body controller 111, gate signals indicating an effective image area and non-effective image areas in the sub-scanning direction of the first surface at a timing when the leading end of the document sheet S reaches the reading line 20 of the optical scanning unit 40. Here, the non-effective image areas are areas from the leading end of the document sheet S to the front end of the effective image area, and from the rear end of the effective image area to the rear end of the document sheet S. The gate signals have ON/OFF, and the effective image area corresponds to ON, and the non-effective image area corresponds to OFF. Transmission of the gate signals is performed until the rear end of the document sheet S passes the reading position on the reading line 20 to be read by the optical scanning unit 40. Here, the timing at which the leading end of the document sheet S reaches the reading position is detected based on the pulse count of the reading motor 103 after the leading end of the document sheet S is detected by the reading entry sensor 87.

The document sheet S having passed though the reading conveyance unit E is conveyed to the ejection unit F. At this time, when the leading end of the document sheet S is detected by the sheet ejection sensor 89, the ADF controller 100 drives the sheet ejection motor 104 in the forward direction to rotate the sheet ejection rollers 67 in the counterclockwise direction. Furthermore, the ADF controller 100 calculates the timing at which the rear end of the document sheet S gets out of the nip of the pair of sheet ejection rollers 67 based on the sheet ejection motor pulse count from the detection of the leading end of the document sheet S performed by the sheet ejection sensor 89. The ADF controller 100 decelerates, based on a result of the calculation, the driving speed of the sheet ejection motor 104 at the timing immediately before the rear end of the document sheet S gets out of the nip of the pair of sheet ejection rollers 67, and performs control such that the document sheet S to be ejected onto the document sheet ejection tray 53 does not fall out.

Here, an energy-saving mode in the image forming apparatus 1 will be described. In the energy-saving mode, power for sensing is supplied to the control panel 108 and the ADF 5a, which is a trigger for a user to use the image forming apparatus 1, and the other power is disconnected. In this manner, the power other than the power for sensing is turned off in the energy-saving mode of the image forming apparatus 1, thereby reducing power consumption.

When the document sheet S is set on the document table 51 in the energy-saving mode, the document set sensor 82 detects the setting of the document sheet S on the document table 51. Accordingly, the image forming apparatus 1 recovers from the energy-saving state. In addition, the image forming apparatus 1 also recovers from the energy-saving state when the touch panel or the like of the control panel 108 is operated in the energy-saving mode.

When the user sets a document sheet on the ADF 5a or operates the control panel 108 as described above, the image forming apparatus 1 in the energy-saving mode executes initial operation of the image forming apparatus 1 including the ADF 5a to recover from the energy-saving state, thereby restarting the image forming apparatus 1 itself. Only after this process, the image forming apparatus 1 recovers to an operation mode state (ADF ready) in which the automatic document feeding is possible.

Accordingly, at the time of recovery from the energy-saving state, the image forming apparatus 1 is not to be operated for a time from the start to the completion of the initial operation of the ADF 5a (hereinafter also referred to as "ADF initial time"). Therefore, in a case where the image forming apparatus 1 is to be used during the ADF initial time, the user waits until the ADF 5a recovers to the operable state (ADF ready) and the image forming apparatus 1 enters the operable state.

At the time of recovery from the energy-saving state, energy-saving recovery signals are output from the main body controller 111, and are received by the ADF controller 100. The ADF controller 100 receives the energy-saving recovery signals. Accordingly, the power of the ADF 5a is turned on.

Further, when the main power of the image forming apparatus 1 is turned on from the off state, power on signals are output from the main body controller 111, and are received by the ADF controller 100. The ADF controller 100 receives the power on signals. Accordingly, the power of the ADF 5a is turned on.

Further, in the state where the main power of the image forming apparatus 1 is on, open signals in the case where the sheet feeding cover 55 is open and close signals in the case where the sheet feeding cover 55 is closed are respectively output from the open-close sensor 18, and are received by the ADF controller 100. The ADF controller 100 receives the open signals or the close signals. Accordingly, the power of the ADF 5a is turned on.

Figure 4:
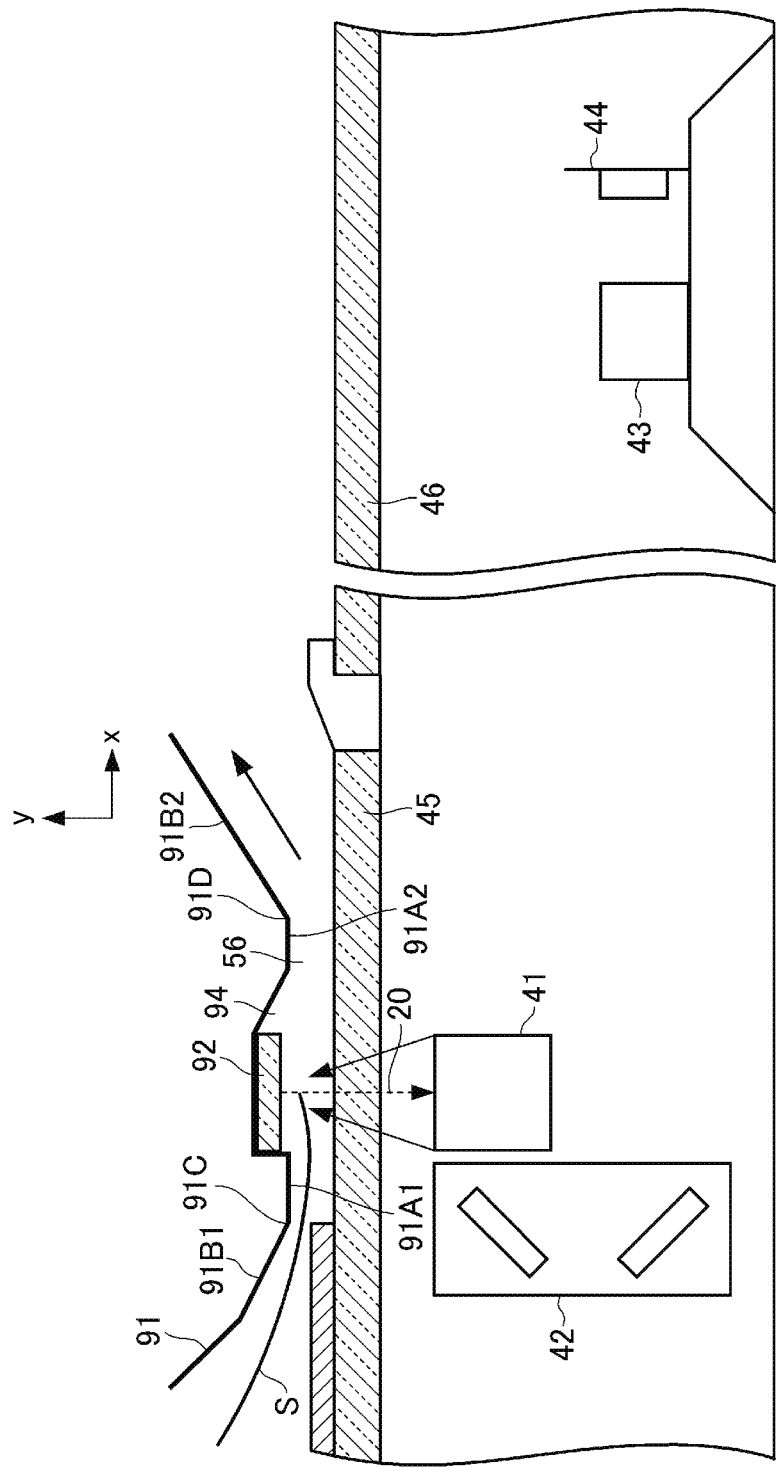
FIG. 4 is a schematic view illustrating a configuration of a document reading guide according to the embodiment of the present disclosure.

FIG. 4 is a view illustrating a configuration of the document reading guide 91 at the reading position of the document sheet S. The document reading guide 91 is an upper guide member that guides the inner side of the document sheet S conveyed from the conveyance upstream side along the conveyance passage 56 through the conveyance roller pair 61 and the conveyance roller pair 63. The document reading guide has a recess 94 at a position facing the first carriage 41 (see FIG. 1) of the optical scanning unit 40 below the first exposure glass 45. The imaging forming lens 43 and the imaging device 44 are disposed on the right side of the first carriage 41.

The above-mentioned portion of the document reading guide 91 is recessed upward as the recess 94, and a transparent member 92 is provided inside the recess 94. The document reading guide 91 is, for example, made of metal, and the recessed shape is processed with a metallic extrusion or extraction material. With such processing, the recessed shape of the document reading guide 91 can be accurately processed.

As will be described later, the ADF 5a according to the present embodiment detects the skew of the document sheet S by detecting the inclination of a shadow W of the document sheet S projected on the document reading guide 91. Therefore, by processing the recessed shape of the document reading guide 91 with high accuracy as described above, the shadow W projected on the document reading guide 91 is made clear. Then, the shadow W can be detected with high accuracy.

The transparent member 92 is a transparent member that transmits light, such as tabular glass having a predetermined thickness. The transparent member 92 is provided inside the recess 94 on the conveyance passage 56 and disposed on the reading line 20 so as to face the optical scanning unit 40. The length of the transparent member 92 in the main scanning direction (direction perpendicular to the drawing sheet surface) is longer than the main scanning direction length of the maximum document size of the ADF 5a. The transparent member 92 extends in a planar manner over the entire document main scanning direction.

Figure 10:
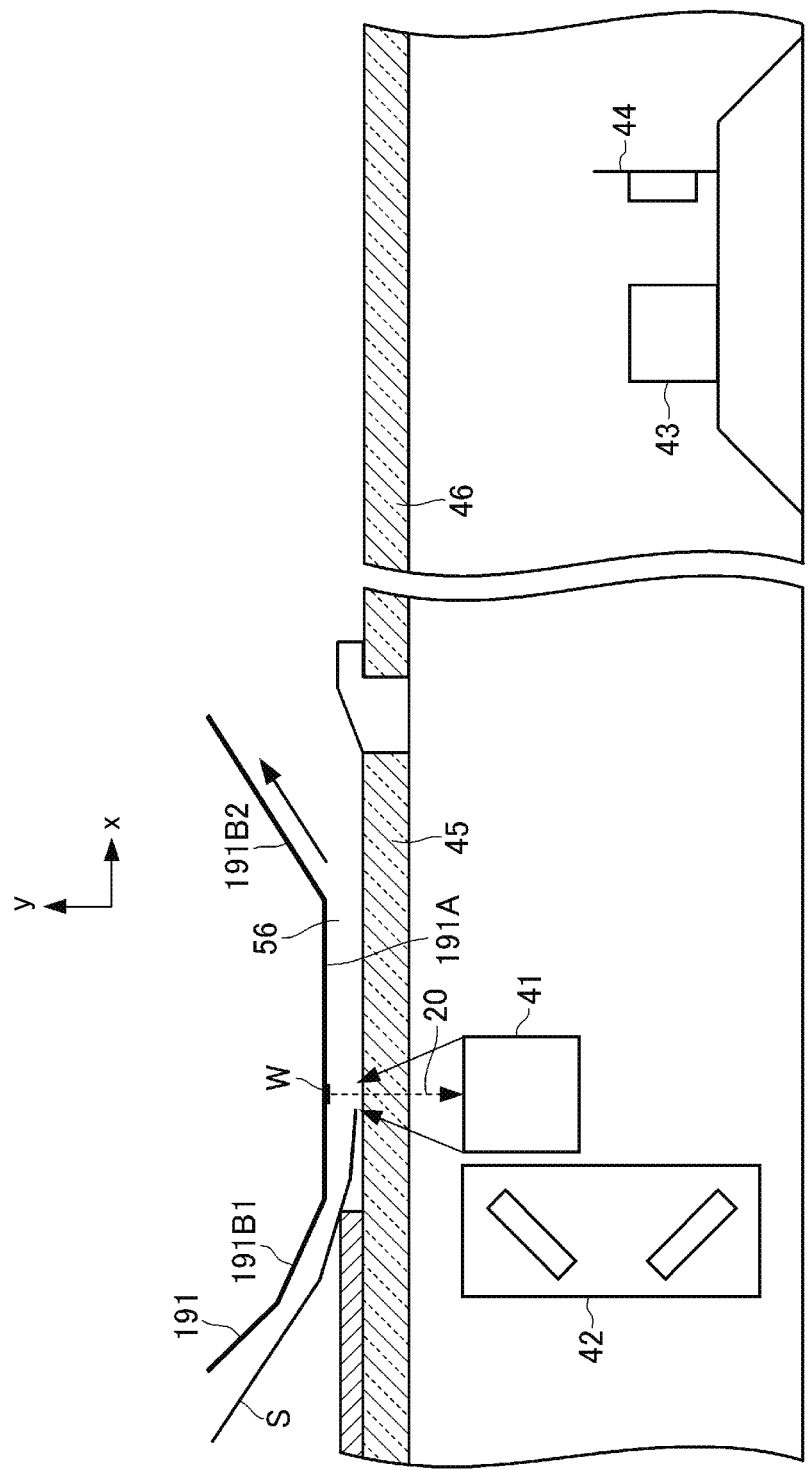
FIG. 10 is a schematic view illustrating a configuration of a comparative document reading guide.
Figure 11:
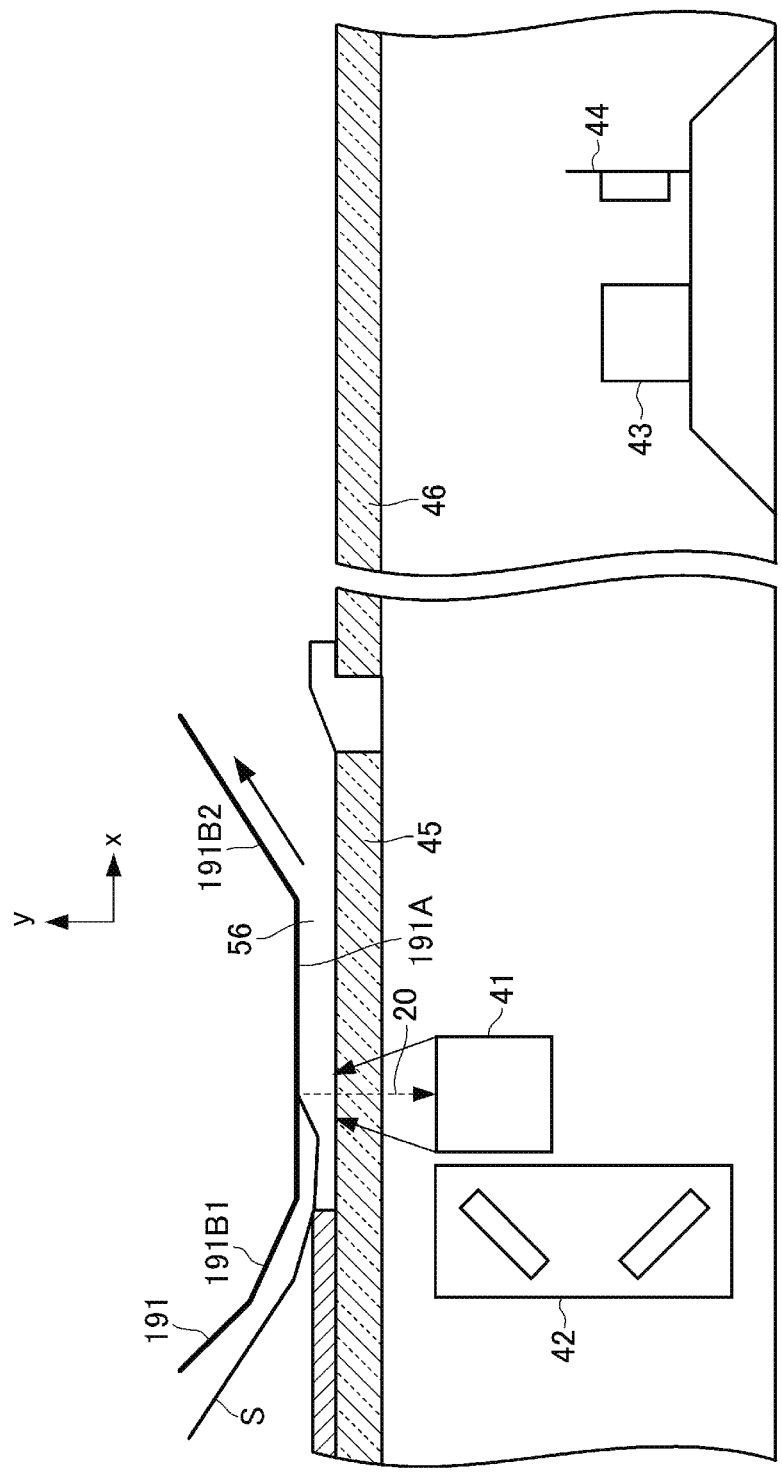
FIG. 11 is another schematic view illustrating the configuration of the comparative document reading guide.

The reason why the transparent member 92 is provided inside the depression of the recess 94 as described above will be described. FIGS. 10 and 11 are schematic views in the case where the document sheet S is conveyed without using a transparent member and without providing a recess at a position facing the optical scanning unit 40 in the comparative document reading guide 191.

FIG. 10 illustrates a case in which the document sheet S is conveyed with the leading end thereof on the conveyance downstream side being close to the first exposure glass 45. A solid-line arrow in the drawing indicates a direction (light emission line) of light emitted from the light source 410 (light-emitting element) of the first carriage 41. A dotted arrow indicates a direction (light receiving line) of the emitted light, and the light is a reading line that is received by the imaging device 44 as a light-receiving element and reads the surface of the document sheet S. The document reading guide 191 includes a guide face 191A (a parallel face) parallel to the first exposure glass 45 and facing the optical scanning unit 40, and inclined portions 191B1 and 191B2 inclined upward to the right and left of the guide face 191A.

At the time of reading the document, the light source 410 in the first carriage 41 of the optical scanning unit 40 irradiates a portion of the document sheet S to be read with an inclination angle θ with respect to the document reading guide 191 and the document sheet S, and the imaging device 44 as a light-receiving element receives light reflected from the direction of the reading line 20 (y direction) via the mirror to read the surface of the document sheet S. The inclination angle θ mentioned here is an angle of inclination in the irradiation direction from the light source 410 in the first carriage 41 with respect to the y direction in FIG. 10.

In a case where the document sheet S is conveyed with the leading end thereof being close to the first exposure glass 45, as illustrated in FIG. 10, the shadow W of the leading end of the document sheet S is projected on the document reading guide 191 from the lower left side in the drawing before the leading end of the document sheet S reaches the reading position on the reading line 20. This is because the positions of the leading end of the document sheet S and the document reading guide 91 in the y direction are different.

FIG. 11 illustrates a case in which the document sheet S is conveyed with the leading end thereof on the conveyance downstream side being close to the document reading guide 191. A solid-line arrow in the drawing indicates a direction (light emission line) of light emitted from the light source 410 (light-emitting element) in the first carriage 41. A dotted arrow indicates a direction (light receiving line) of the emitted light, and the light is a reading line that is received by the imaging device 44 as a light-receiving element and reads the surface of the document sheet S. The document reading guide 191 includes a guide face 191A parallel to the first exposure glass 45 and facing the optical scanning unit 40, and inclined portions 191B1 and 191B2 inclined upward to the right and left of the guide face 191A.

In a case where the document sheet S is conveyed with the leading end thereof being close to the document reading guide 191, the positions of the leading end of the document sheet S and the document reading guide 191 in the y direction are substantially the same, and the timing at which the light source 410 in the first carriage 41 irradiates the document sheet S from the lower left side in FIG. 11 and the shadow W of the leading end of the document sheet S is projected on the reading line 20 of the document reading guide 191 and the timing at which the leading end of the document sheet S passes the reading line 20 of the document reading guide 191 are substantially the same. Accordingly, it is difficult to read the shadow W of the document sheet S projected on the document reading guide 191.

Therefore, the document reading guide 191 as illustrated in FIGS. 10 and 11 may fail to detect the shadow W of the document sheet S projected on the document reading guide with the imaging device 44. Accordingly, skew correction based on the method of detecting a skew amount by detecting the shadow W of the document sheet S is not feasible with high accuracy.

Figure 5:
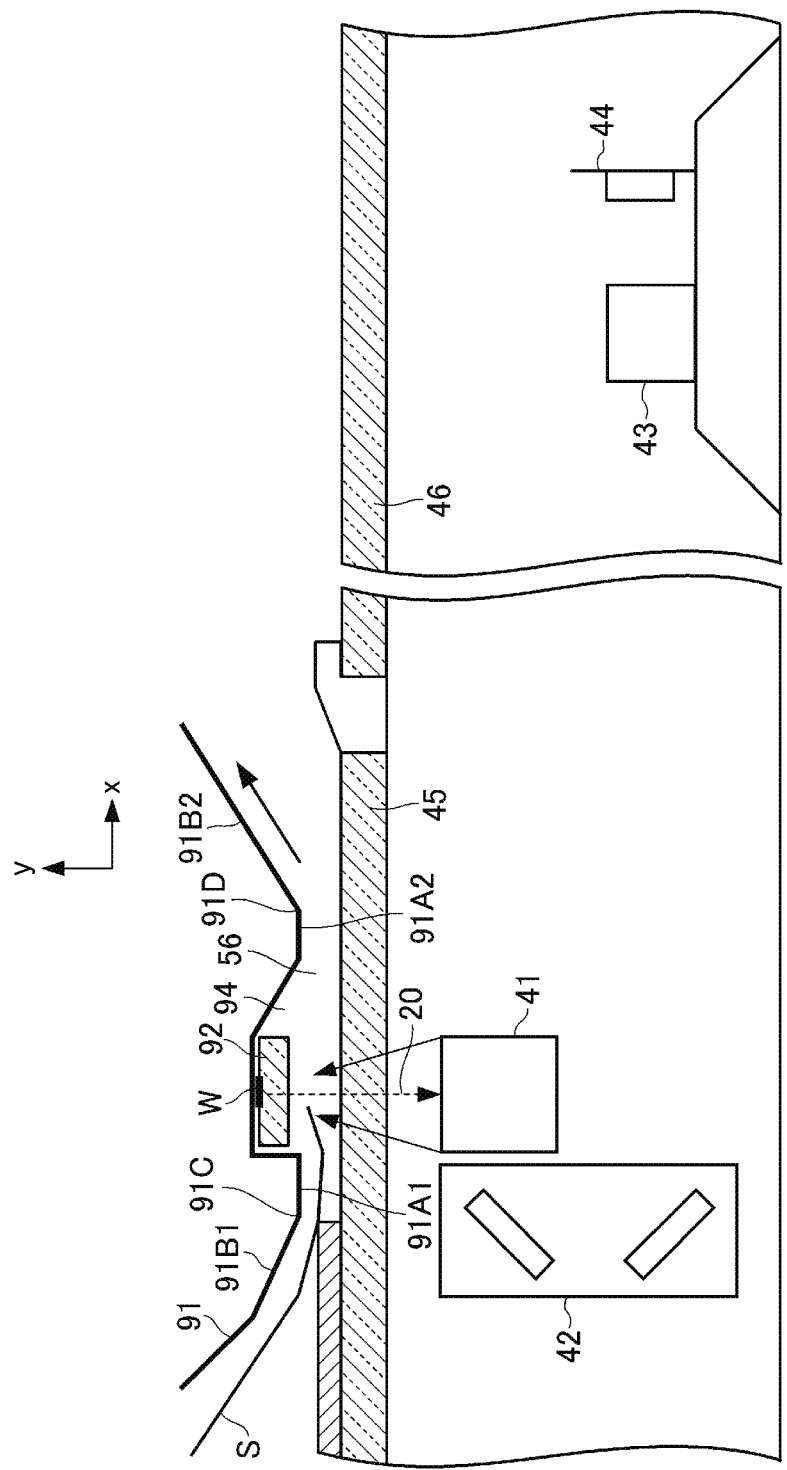
FIG. 5 is a schematic view illustrating the document reading guide according to the embodiment of the present disclosure in a state where a shadow of a document end is projected.
Figure 6:
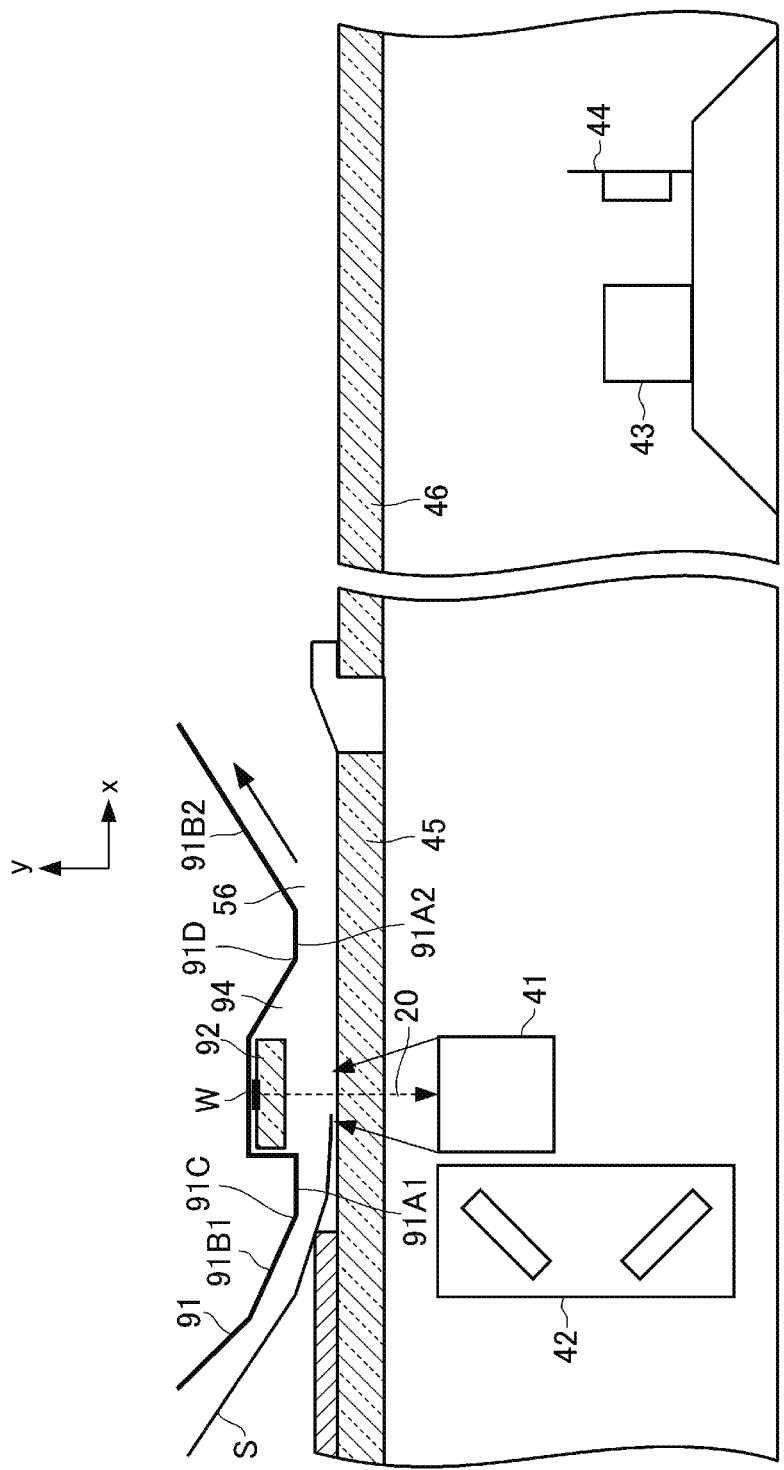
FIG. 6 is another schematic view illustrating the document reading guide according to the embodiment of the present disclosure in the state where a shadow of a document end is projected.

FIGS. 5 and 6 are schematic views in the case where the document sheet S is conveyed using the transparent member 92 with the recess 94 being provided at a position facing the optical scanning unit 40 in the document reading guide 91 according to the present disclosure.

FIG. 5 illustrates a case in which the document sheet S is conveyed with the leading end thereof on the conveyance downstream side being close to the document reading guide 91. A solid-line arrow in the drawing indicates a direction (light emission line) of light emitted from the light source 410 (light-emitting element) in the first carriage 41. A dotted arrow indicates a direction (light receiving line) of the emitted light, and the light is a reading line that is received by the imaging device 44 as a light-receiving element and reads the surface of the document sheet S.

The document reading guide 91 includes guide faces 91A1 and 91A2 parallel to the first exposure glass 45 and facing the optical scanning unit 40. The document reading guide 91 further includes an inclined portion 91B1 inclined upward (to the upstream side in the conveyance direction, to the left in FIG. 5) from the guide face 91A1, and an inclined portion 91B2 inclined upward (to the downstream side in the conveyance direction, to the right in FIG. 5) from the guide face 91A2. The area between the guide faces 91A1 and 91A2 are recessed upward, thereby providing the recess 94. The boundary between the guide face 91A1 and the inclined portion 91B1 constitutes a regulation portion 91C for regulating the position of the document sheet S conveyed through the conveyance passage 56, and the boundary between the guide face 91A2 and the inclined portion 91B2 constitutes a regulation portion 91D for regulating the position of the document sheet S conveyed through the conveyance passage 56.

Disposed in the recess 94, the transparent member 92 is withdrawn from the conveyance passage 56 defined by the guide faces 91A1 and 91A2.

As described above, in the case where the document reading guide 91 includes the transparent member 92, the transparent member 92 has a thickness. Accordingly, the positions of the document sheet S and the document reading guide 91 in the y direction are different by at least the thickness of the transparent member 92 in the y direction in the case where the document sheet S is conveyed with the leading end thereof being close to the transparent member 92. This point is similar even in the case where the document sheet S is conveyed with the leading end thereof being in contact with the transparent member 92. Therefore, the shadow W of the leading end of the document sheet S is projected on the document reading guide 91 before the leading end of the document sheet S reaches the reading position on the reading line 20. The thickness of the transparent member 92 is made to be thinner than the thickness of the first exposure glass 45.

The imaging device 44 detects the shadow W projected on the document reading guide 91 on the reading line 20 through the mirror material or the like. The light amount level to be detected by the imaging device 44 largely changes at two timings including the timing at which detection of the shadow W of the document sheet S on the reading line 20 starts from the state of detecting the surface of the document reading guide 91 and the timing at which detection of the document sheet S itself on the reading line 20 starts from the state of detecting the shadow W of the document sheet S in the process of the document sheet S passing over the reading line 20 of the document reading guide 91. The skew can be detected using any of the two timings mentioned above. Therefore, the shadow W of the document sheet S projected on the document reading guide 91 can be detected by the imaging device 44 with high accuracy.

FIG. 6 illustrates a case in which the document sheet S is conveyed with the leading end thereof on the conveyance downstream side being close to the first exposure glass 45. A solid-line arrow in the drawing indicates a direction (light emission line) of light emitted from the light source 410 (light-emitting element) of the first carriage 41. A dotted arrow indicates a direction (light receiving line) of the emitted light, and the light is a reading line that is received by the imaging device 44 as a light-receiving element and reads the surface of the document sheet S.

In a similar manner to the case illustrated in FIG. 5, in the case where the document reading guide 91 includes the transparent member 92, the transparent member 92 has a thickness. Accordingly, the positions of the document sheet S and the document reading guide 91 in the y direction are different by at least the thickness of the transparent member 92 in the y direction in the case where the document sheet S is conveyed with the leading end thereof being close to the first exposure glass 45. Therefore, the shadow W of the leading end of the document sheet S is projected on the document reading guide 91 before the leading end of the document sheet S reaches the reading position on the reading line 20.

Figure 7:
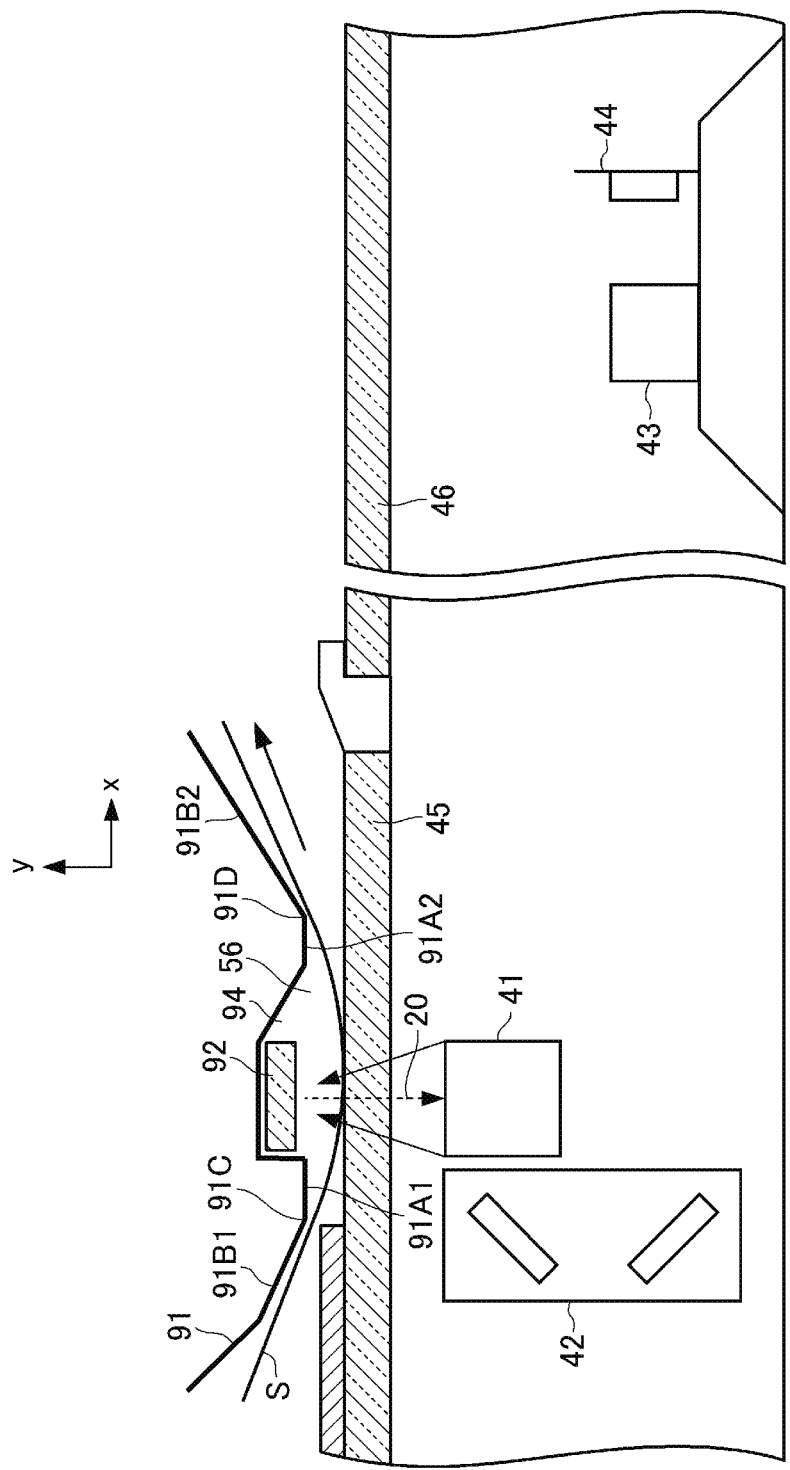
FIG. 7 is a schematic view illustrating a state in which the document reading guide according to the embodiment of the present disclosure is regulated.

As illustrated in FIG. 7, in a case where the conveyance passage 56 of the document sheet S is a curved conveyance passage and is not a straight conveyance passage, the document sheet S needs to be regulated to stabilize the read image on the reading line 20. Even in the case where the transparent member 92 is provided, the document sheet S is regulated by the regulation portions 91C and 91D of the document reading guide 91. The regulation portion 91C is formed by the boundary between the guide face 91A1 substantially parallel to the first exposure glass and the inclined portion 91B1 on the upstream side, and the regulation portion 91D is formed by the boundary between the guide face 91A2 substantially parallel to the first exposure glass and the inclined portion 91B2 on the downstream side. The regulation portions 91C and 91D regulate the position of the document sheet S conveyed on the conveyance passage 56. In order to achieve such a configuration, the guide faces 91A1 and 91A2 of the document reading guide 91 facing the optical scanning unit 40 are provided substantially parallel to the first exposure glass 45 on the right and left of the recess 94 so that the document reading guide 91 is not constituted only by the inclined portions 91B1 and 91B2 and the recess 94.

Figure 8:
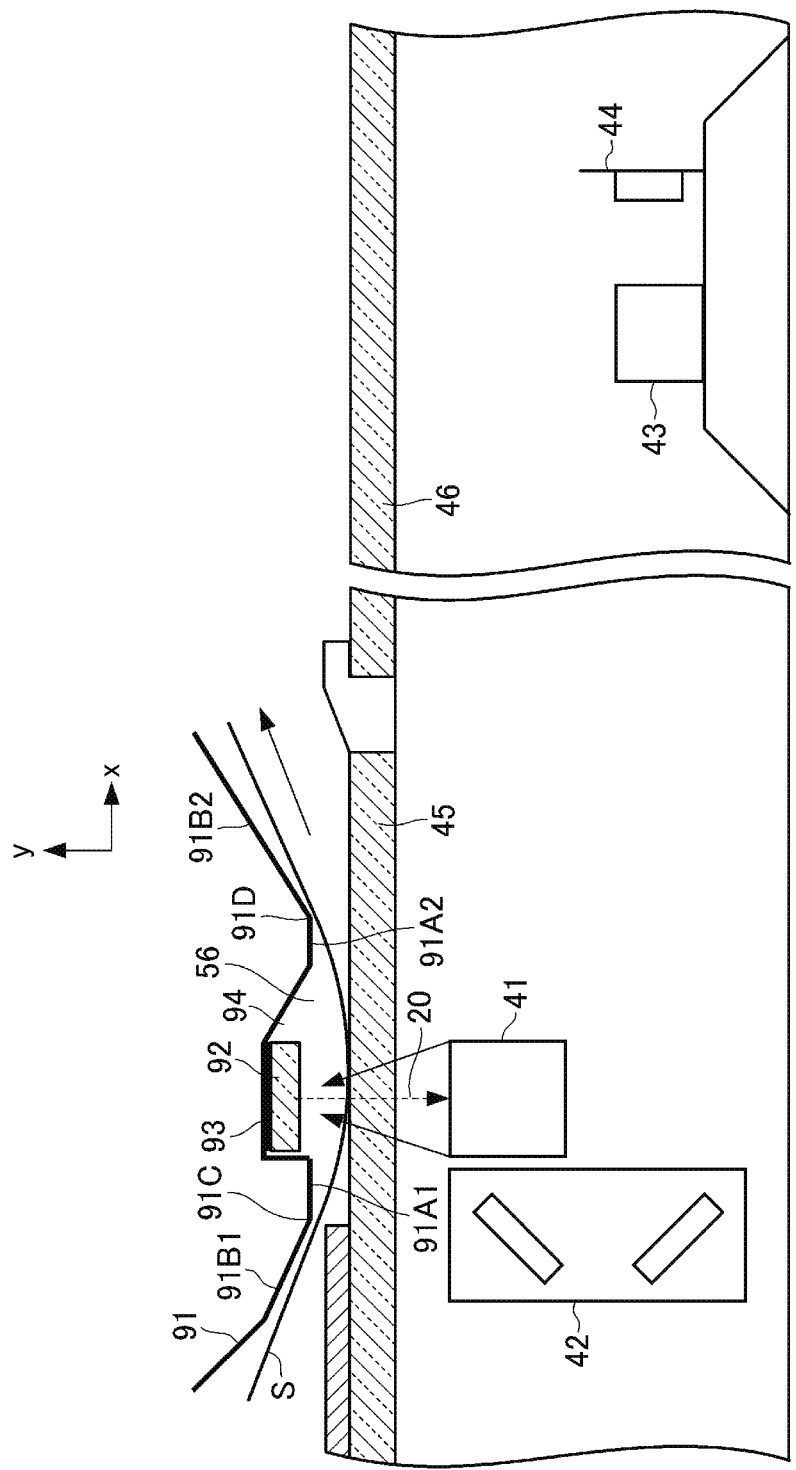
FIG. 8 is a schematic view illustrating a configuration of a variation of the document reading guide according to the embodiment of the present disclosure.

As illustrated in FIG. 8, a white sheet member 93 can be provided between the transparent member 92 and the document reading guide 91. The white sheet member 93 can be, for example, a white thin plastic member. Such an unpainted sheet member has no unevenness or irregularity on the surface. Accordingly, the stability of the color reflected on the white sheet member 93 can be ensured.

Figure 9:
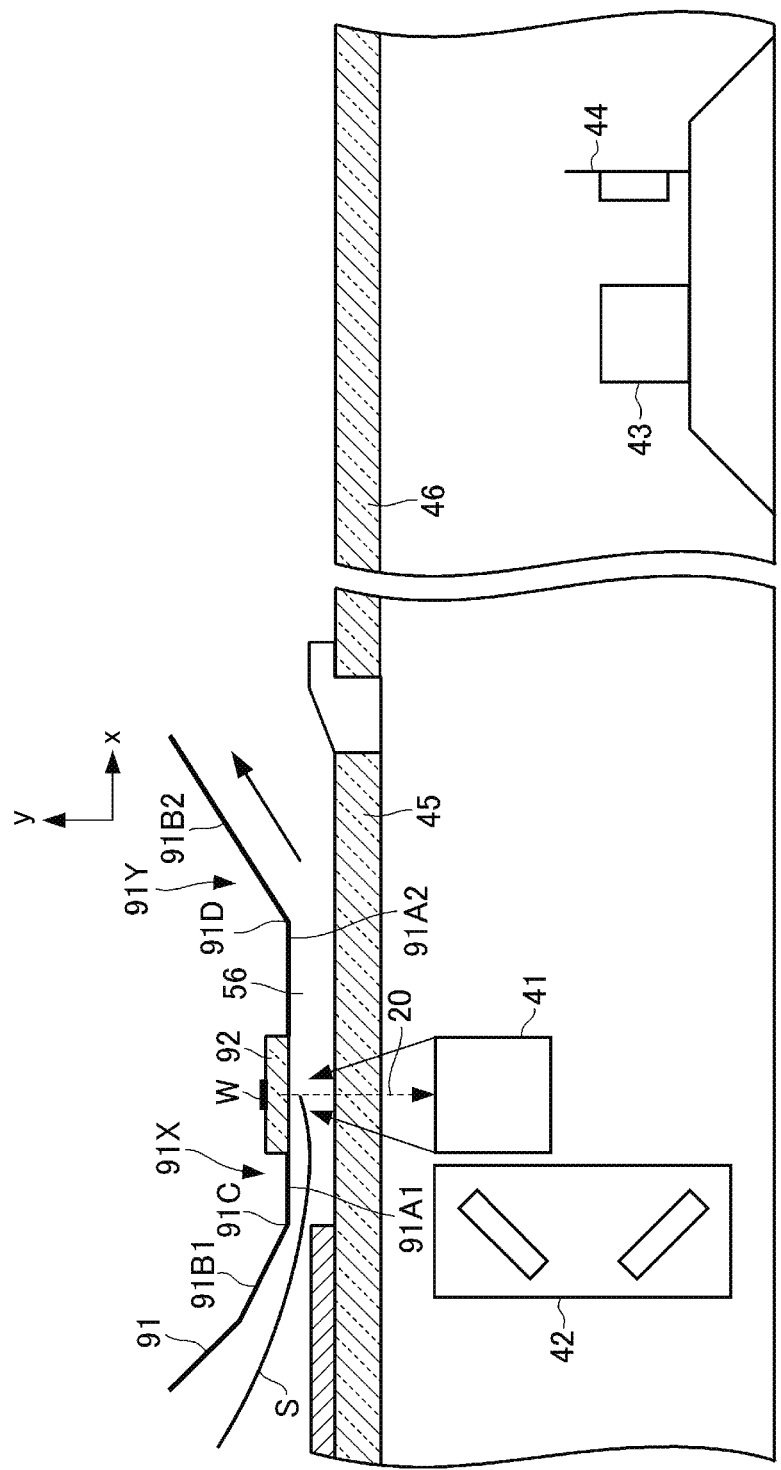
FIG. 9 is a schematic view illustrating a configuration of another variation of the document reading guide according to the embodiment of the present disclosure.

Further, as illustrated in FIG. 9 as a variation of the configuration of the document reading guide 91, the document reading guide 91 can have a configuration in which the transparent member 92 is provided between a document reading guide 91X on the upstream side between a document reading guide 91Y on the downstream side. The other configurations are similar to those in FIG. 5. In such a configuration, the lower surface of the transparent member 92 guides the sheet material, such as the document sheet S, together with the document reading guides 91X and 91Y.

As described above, the image reading apparatus 6 according to the present embodiment includes the document table 51 and the sheet feeding cover 55 that place and accommodate the document sheet S, the conveyance roller pair 61, 63, and 65 that convey the document sheet S to a predetermined conveyance target position, the document reading guide 91 that guides the document sheet S conveyed by the conveyance roller pair 61, 63, and 65, and the optical scanning unit 40 that reads an image on the document sheet S conveyed by the conveyance roller pair 61, 63, and 65, and is provided with the transparent member 92 at a position on the reading line 20 to be read by the optical scanning unit 40 between the document reading guide 91 and the document sheet S.

With this configuration, the image reading apparatus 6 according to the present embodiment includes the transparent member 92 at a position facing the optical scanning unit 40 between the document reading guide 91 and the document sheet S. Accordingly, the shadow W can be reliably projected on the document reading guide 91 regardless of a state of an end portion of the document sheet S and a thickness of the document. In addition, the transparent member 92 is extended in a planar manner over the entire main scanning direction. Accordingly, a read image without tones can be obtained.

Furthermore, in the image reading apparatus 6 according to the present embodiment, the document reading guide 91 can have the recess 94 at a position facing the optical scanning unit 40, and the recess 94 can be provided with the transparent member 92.

With this configuration, the image reading apparatus 6 according to the present embodiment regulates the position of the document sheet S with the document reading guide 91. Accordingly, the accuracy in positional deviation between the first exposure glass 45 and the document reading guide face due to variation in thickness of the transparent member 92 can be ensured.

Furthermore, the image reading apparatus 6 according to the present embodiment can include the regulation portion 91C and the regulation portion 91D at the end portions of the guide face 91A1 and the guide face 91A2 for document reading of the document reading guide 91 facing the optical scanning unit 40, which are substantially parallel to the first exposure glass 45.

With this configuration, the image reading apparatus 6 according to the present embodiment regulates the position of the document sheet S with the regulation portion 91C and the regulation portion 91D of the document reading guide 91. Accordingly, the accuracy in positional deviation can be ensured.

Furthermore, the image reading apparatus 6 according to the present embodiment can include the white sheet member 93 between the transparent member 92 and the document reading guide 91.

With this configuration, the image reading apparatus 6 according to the present embodiment does not apply a coating to the sheet member provided between the transparent member 92 and the document reading guide 91. Accordingly, no unevenness or irregularity due to the coating is generated on the surface of the sheet material. As a result, stability of the color reflected on the white sheet member 93 can be ensured.

Furthermore, in the image reading apparatus 6 according to the present embodiment, the document reading guide 91 including the recess 94 in a recess shape can be a metal material. The image reading apparatus 6 according to the present embodiment detects a skew amount using a shadow. Accordingly, an error in skew detection becomes large when the shadow accuracy is poor. The recess shape is processed with a metallic extrusion/extraction material. Accordingly, the recess 94 in the recess shape of the document reading guide 91 can be processed with high accuracy. The recess 94 having a high accuracy can eliminate misalignment between the document reading guide 91 and the transparent member 92 disposed in the recess 94, thereby securing the accuracy of the shadow W to be projected on the document reading guide 91.

Furthermore, the image reading apparatus 6 according to the present embodiment can include the document set sensor 82 that detects the presence or absence of the document sheet S accommodated in the document table 51 and the sheet feeding cover 55, the pickup roller 58 that holds the document sheet S accommodated in the document table 51 and the sheet feeding cover 55, and a pullout motor 113 that applies conveying force to the document sheet S held by the pickup roller 58 toward the conveyance roller pair 61, 63, and 65 and feeds the document sheet S.

Furthermore, the image reading apparatus 6 according to the present embodiment can include the imaging device 44 that detects the skew amount of the image read by the optical scanning unit 40, and the ADF controller 100 that corrects the inclination of the image read by the optical scanning unit 40 based on the skew amount detected by the imaging device 44.

Furthermore, the image forming apparatus 1 according to the present embodiment can include the image reading apparatus 6, and the image forming device 3 that forms the image corrected by the ADF controller 100.

According to the present disclosure, a shadow can be reliably projected on the guide member regardless of a state of the document end or a thickness of the document, and a read image without tones can be obtained, which is useful for document reading devices and image forming apparatuses in general.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A sheet reading apparatus comprising:
a sheet table on which a sheet is placed;
a conveyor configured to convey the sheet;
a reading guide configured to guide the sheet conveyed by the conveyor, the reading guide including a guide face;
a reading device including a scanner configured to read, through a reading table which is parallel to the guide face, a shadow of the sheet conveyed by the conveyor, for detection of an inclination of the sheet;

a transparent element disposed at a position on a reading line of the reading device, the position on the reading line being withdrawn from the sheet and adjacent to the reading guide, the transparent element having a non-changeable surface at a side of the transparent element opposite to the reading table such that light passing through the transparent element is not reflected off of any changeable surface at the side of the transparent element opposite to the reading table; and a recess which is recessed from the guide face and which is further from the reading table than the guide face.

2. The sheet reading apparatus according to claim 1, wherein:

the non-changeable surface includes a white sheet disposed between the transparent element and the reading guide.

3. The sheet reading apparatus according to claim 1, wherein the reading guide including the recess is made of metal.

4. The sheet reading apparatus according to claim 1, further comprising:

a sheet detector configured to detect presence or absence of the sheet on the sheet table;

a sheet nip assembly configured to nip the sheet on the sheet table; and a driver configured to apply a conveyance force to the sheet nip assembly nipping the sheet, to convey the sheet toward the conveyor.

5. The sheet reading apparatus according to claim 1, further comprising:

a skew amount detector configured to detect, based on the shadow of the sheet projected on the reading guide, a skew amount of an image of the sheet read by the reading device; and circuitry configured to correct an inclination of the image read by the reading device based on the skew amount.

6. The sheet reading apparatus according to claim 1, wherein the sheet is a document sheet.

7. An image forming apparatus comprising:

the sheet reading apparatus according to claim 1; and an image forming device configured to form an image.

\* \* \* \* \*